Patented Dec. 7, 1937

2,101,371

UNITED STATES PATENT OFFICE 2,101,371

OIL RECOVERY

Vicente G. Lava, Manila, P. I.

No Drawing. Application October 15, 1937,
Serial No. 169,144

15 Claims. (Cl. 87—6)

The invention relates to a process for the recovery of oil from vegetable materials.

More particularly, it relates to a procedure in which oil is recovered from nuts, specifically the cocoanut and includes correlated improvements and discoveries whereby the quantity and quality of oil recovered are enhanced.

Heretofore a cocoanut oil has been obtained by pressing copra previously heated to a comparatively high temperature. The crude oil thereby obtained was refined by various methods, e. g. by treatment with alkali, acid, heat and vacuum, decolorizers, etc. In recent years attempts have been made to separate oil from comminuted cocoanut meat. Thus in the Beckman process (British 326,196), ground cocoanut meat is mixed with magnesium carbonate, and the mixture inoculated with a lactic acid-forming bacterial culture from brewer's barley. The magnesium carbonate is a neutralizing agent for the acid formed, and the function of the bacteria is to destroy the cellular structure containing the oil. In another process (British 303,413) acid is added to crushed copra until the pH value is 2. It will be observed that in these patents, the oil is obtained directly from the previously treated ground cocoanut meat.

These procedures have certain disadvantages inasmuch as, if the comminuted cocoanut meat is inoculated with micro-organisms, no matter what odorless and tasteless end-products of fermentation these micro-organisms may theoretically produce, other atmospheric micro-organisms will contaminate the treated batch of cocoanut meat, and produce undesirable properties in the quality of the pressed cocoanut cake. Furthermore, if the cocoanut meat is treated with acid, especially to a pH value of 2.0, the pressed cocoanut meat cake will taste very sour and be unfit for human use. In addition, the quantity of oil extracted is relatively low.

It is an object of the invention to provide a process in accordance with which an oil of high purity and substantially without color may be recovered from various oil bearing vegetable materials.

Another object of the invention is to provide a procedure whereby the oil of nuts, e. g. the cocoanut, may be recovered in its substantial entirety as a refined and colorless oil.

A further object of the invention is the provision of a process whereby recovery of oil from the cocoanut may be effected to any suitable extent, which process may be readily, effectively and economically carried out on a commercial scale and which yields also a cocoanut meat residue containing a greater or lesser quantity of oil, as may be desired.

A more specific object of the invention is the provision of a process for recovering oil from the cocoanut which includes preparing an aqueous emulsion and then separating the oil therefrom.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention, cocoanut meat may be obtained from the cocoanut in a suitable manner, and comminuted preferably to a size larger than that of sawdust; the comminution being effected by a shredder or arrangement of knives in such manner that the sub-division of the meat is without a substantial rupturing of the cell structure. The meat after removal of the shell, and either with or without breaking into pieces, is pressed against a series or bank of sharp knives whereby the meat is cut into thin slices or ribbons. Such slicing may be done by a single sharp knife but, of course, not as efficiently. These thin slices or ribbons may again be passed through the knives thereby cutting them into square or rectangular strips having a thickness which may be about $\tfrac{1}{16}$ inch, or more. The meat is thus sub-divided or comminuted without grinding, or grating, or rubbing, and is in the form of shreds of greater or lesser length with substantially no rupturing of the cell structure. In the event that a large roller is used for removing the oil and water, it will not be necessary to shred the meat but rather it may simply be broken into pieces, if need be by hand, about 4 inches square. Moreover, with rollers of sufficient size the meats may be pressed with water as they come from the shell.

The comminuted meat is then passed through a press, e. g. through a roller mill similar to that used for sugar cane milling, with water at a temperature of from 22° C. to 100° C., being added during pressing or admixed with the meat before pressing. The extraction by water admixture and pressing may be repeated two or three times, depending upon the amount of oil to be retained in the pressed cocoanut meat cake and thereby an oil-in-water emulsion is obtained. The temperature of the mass of comminuted cocoanut meat cake and water should lie between 22° C. and 60° C. Water added may vary up to five times the weight of meat.

The pressed cocoanut meat cake may be dried and may be used as human food. If it is desired to market the dried pressed cocoanut meat cake as a dessicated cocoanut, then fresh meat is pared before comminuting and pressing.

A separation of refined or purified cocoanut oil from the oil-in-water emulsion resulting from the pressing of the comminuted meat with water may be effected by a chemical treatment whereby the pH value of the emulsion is adjusted to from 3.0 to 5.6 through the addition thereto of an acid reacting substance, for example, an inorganic or organic acid, followed by separation of the oil and water and a subsequent heating, if required, more completely to free the oil from suspended materials which cause cloudiness. Further, the emulsion may be resolved or broken by inoculation with a micro-organism, e. g. bacilli which have the property of effecting a fermentation with the formation of acid substances as lactic acid, acetic acid, butyric acid, etc. Furthermore, the resolution of the emulsion may be accomplished by adding an alcohol thereto, or by a heating and evaporating to a temperature upwards to 280° C., and preferably at about 120° C. It is my belief, but it will be understood that I do not wish to be limited thereto, that the efficacy of the methods utilizing pH adjustment for resolution of the emulsion is predicated upon the consideration that the cocoanut oil emulsion is stabilized by the presence of minute particles of material of protein characteristics and that these particles surround the oil globules, preventing thereby their coalescence. When the conditions surrounding the particles of protein material are adjusted substantially to the isoelectric points thereof, these materials separate or precipitate and permit the oil globules to coalesce, whereby the emulsion is broken.

The belief regarding the precipitation with a non-acid precipitant, such as an alcohol, is predicated upon the same consideration, and that with respect to the treatment at the relatively high temperature is founded upon the thought that the material of protein nature acts as a protective colloid, stabilizing the emulsion only when in hydrated form, and that as soon as dehydration is brought about, the protective property ceases and the emulsion is resolved or broken.

The extraction of the oil, as above described, leads to a mass which upon standing separates into three layers, namely a top layer containing most of the oil, a middle layer containing material of a protein and also of a cellulosic nature, and an aqueous bottom layer.

The aqueous bottom layer in the cocoanut oil emulsion may be siphoned off or separated in any other way after thirty minutes or one hour, from the top and middle layers which contain the oil emulsion and some settled protein residue, respectively; or the oil emulsion layer may be separated from the aqueous solution containing mostly protein, by a low-power centrifuge.

This aqueous extract, or bottom layer, may be used for admixture with comminuted cocoanut meat, or it may be used for acetic, propionic, butyric acid or alcoholic fermentation. Care should be taken that the oil emulsion is not so viscous as to effect a retardation of the subsequent treatment. The oil emulsion, following removal of water, is treated with an acid reacting substance as inorganic or organic acids, singly or mixed, or with acid salts or a buffer combination such that the pH value of the emulsion is from 3.0 to 5.6, and more specifically, 3.5 to 5.1. The emulsion and acid substance are thoroughly mixed or stirred for some time, and after about two hours—depending upon the efficiency of stirring which is to subject the whole of the emulsion to the proper pH—, is centrifuged in a relatively high-power centrifuge.

Oil thus obtained may be slightly cloudy, especially if the pH value is not properly adjusted, and the protein containing residue may have some oil carried over. The cloudy oil is then heated, preferably under vacuum, to a temperature upwards to 280° C. until water of hydration of the protein material is evaporated, whereupon the oil becomes clear; after which the oil may be filtered, e. g. in a filter press, or merely passed through a cloth sieve under section. The solid residue containing some oil together with the residue from the centrifuge before acid treatment is similarly heated, preferably under vacuum and with stirring or mixing, and when most of the water is evaporated, the oil is filter-pressed. A refined oil of high purity and a protein containing cake are thereby obtained. The oil from the residue and the oil obtained from the cloudy oil may be mixed together. The protein cake may be utilized as high grade food, since it contains over 70 per cent by weight of protein.

During the treatment of the cocoanut oil emulsion and its subsequent centrifuging, the emulsion may be raised in temperature to about 80° C., this procedure having the effect of accelerating the breaking of the emulsion and coalescence of the oil.

As an illustrative embodiment of the manner in which the invention may be practiced, the following examples are presented:

*1*

Ten cocoanuts are opened and the meat separated from the shell. The meat is then passed through a shredding machine of the type used for the manufacture of dessicated cocoanut so that the meat will be shredded or cut without substantial rupturing of the cell structure, and one liter of water added to the comminuted meat. The temperature of the mixture or mass is about 28° C. After a few minutes mixing, the mixture of water and cocoanut meat is placed in a cloth and pressed; the cocoanut oil emulsion passing into a container. Another liter of water is now added to the pressed meat, water and meat again mixed, and then again pressed through cheese cloth. The emulsion-extract from the second pressing is added to that from the first-pressing, and the combined emulsion allowed to stand for about one hour, after which the bottom aqueous layer is siphoned off. The two upper layers containing the oil-water-emulsion and a protein containing residue have a volume of about 1.5 liters. To this volume is added 303 cc. of N/10 acetic acid, and the mixture agitated thoroughly for about five to ten minutes. The resulting pH of the emulsion is 4.5. After two hours' standing at a temperature of about 38° C. the whole mixture is centrifuged in a high power centrifuge (12,000–30,000 R. P. M.). The oil is thus separated. If a Sharpless supercentrifuge is used the oil comes out through a separate opening. In case a bacteriological supercentrifuge is used, the oil separates on top, while the protein containing residue settles on the bottom, almost free of oil. The preferred centrifuge is of the Rotojector type which has separate openings for water, oils and solids.

*2*

The meat of ten cocoanuts is separated from the shell, and the meat cut into small pieces of about 1/8" thickness in such a manner that the cell structure is substantially unruptured. Then the meat is mixed with water, the temperature of the mixture being around 27° C. The mixture is now passed through a roller mill, and the emulsion obtained is freed from small particles of cellulose by passing it through a metal sieve, following which it is passed through a Titan centrifuge. 1.8 liters of concentrated emulsion are obtained. To this is added 27 cc. of N/1 hydrochloric acid; the mixture stirred thoroughly for about 10 to 15 minutes, and finally allowed to stand for three hours at 80° C. The pH value on cooling to a temperature of about 27° C. to 5.1. Then the mass is centrifuged, whereby oil is separated from water, and a residue containing some oil is obtained. The oil is cloudy, and, hence, is heated to about 120° C. under vacuum until the protein material does not pass through a cloth sieve; whereupon it is filtered or pressed. The residue from the centrifuge may be treated in a similar way, but, it must be heated for a longer time. It will be understood that while the pH value desirably is 5.1, nevertheless it may vary and be within the range 3.0 to 5.6, and that such value may be attained by employing an acid substance or an acid-producing organism.

3

The aqueous bottom layer from the cocoanut oil emulsion extracted from the comminuted cocoanut meat, as described in Example 1, is separated as therein set forth. Instead, however, of adding an acid reacting substance to bring the protein stabilizers or protective colloids of the emulsion to the isoelectric points for separation, the emulsion is here inoculated with an acid-producing micro-organism, e. g. bacilli, whose other products of fermentation with sugars and cellulose as substrate, are not ill-smelling. The acid, e. g., lactic, acetic, propionic, butyric, kojic, etc., produced adjusts the pH to the required value for separating the protein material stabilizers. In order to reach this point, twelve to twenty-four hours of standing at a temperature about 25° C. are necessary. The temperature of fermentation may be raised to 60° C. depending upon the optimum conditions of growth of the particular organism, and substrate and salts may be added depending upon the requirements of the micro-organism. After this period of fermentation, the broken emulsion is treated in the same way as in Example 1.

The aqueous bottom layer directly obtained from the cocoanut oil emulsion extracted from the comminuted cocoanut meat may be fermented for acid production and used as partial addition to the acid used. Further the acid aqueous extract separated from the oil by centrifuging the inoculated emulsion may be used in a similar way. In addition, the aqueous bottom layer may be utilized for the production of a cocoanut toddy by admixing sugar therewith and fermenting.

4

This method is like unto that described in Example 1, for the obtainment of the oil-in-water emulsion. It effects separation of the oil by adding thereto an alcohol, as ethyl alcohol. Thus, when the alcohol is added in quantities of 50 per cent or more, of the volume of the emulsion, the oil globules coalesce easily, and oil may be separated from the water by filtration or by the centrifuge.

5

In this method, the emulsion obtained by pressing the comminuted cocoanut meat is centrifuged in a high power centrifuge, thereby separating as much of the aqueous solution as possible. In this centrifuging process, the original cocoanut oil emulsion is separated into three components: (a) a thick cocoanut oil emulsion almost at the point of breaking, (b) a protein containing residue containing some oil, and (c) an aqueous extract containing some protein material and almost free from oil. The component (c) may be fermented for acid production for the market or for use in the above described methods. The oil emulsion may be centrifuged a plurality of times, if desired, thereby giving a less viscous emulsion and finally the emulsion and the protein residue (a) and (b) respectively, are brought together and heated, preferably under vacuum and with stirring or mixing at a temperature not over 280° C. until the protein material separates from the oil. They are finally separated by filter pressing or by other suitable method.

It will be realized that the methods hereinbefore given may be combined. Thus, the oil emulsion may be treated first by Example 1, or 3, and after a few hours' standing, the aqueous extract may be separated from the oil and residue by decanting, siphoning or centrifuging. Following this the oil and residue portions are treated by heating to a temperature upwards to 280° C., and preferably about 120° C. Further, it is desired to state that when the alcohol and pH adjustment procedures are conjointly practiced, the pH value may be from 2.5 to 7.0. Moreover, the procedure herein described may be adapted for recovery of oil from nut meats other than the cocoanut, and from oleaginous seeds, such as soy bean and like beans, peanuts, lumbang nut, castor seed, pili nut, cashew nut, palm oil nut, cottonseed, calumpang nut, babassu nut, avocado seed, poppyseed, sesame seed.

In accordance with the present invention which includes pressing comminuted cocoanut meat with water two or three times, I obtain as high as 98 per cent of the total extractable oil from the cocoanut meat, in the form of an oil emulsion. Further, I not only control the amount of oil in the cocoanut meat cake, which meat cake may be dried by a suitable procedure and sold as food, especially as a dessicated cocoanut of lower oil content, if the fresh cocoanut meat were previously pared, but also obtain a cocoanut oil of high purity. The amount of oil obtained depends upon the specific demand as to the oil content of the dessicated cocoanut.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements ot the scope of the invention which, as a matter of language, might be said to fall therebetween.

This application is a continuation in part of my copending application Ser. No. 95,846, filed August 13, 1936.

Having described my invention, what I claim as new and desire to secure by Letters Patent, is:

1. A process for the recovery of oil from the cocoanut which comprises comminuting cocoanut meat without a substantial rupturing of the cell structure, admixing with water, pressing the admixture of meat and water whereby an oil-in-water emulsion is formed, and subsequently separating oil from the emulsion.

2. A process for the recovery of oil from the cocoanut which comprises comminuting cocoanut meat without a substantial rupturing of the cell structure, admixing with water at a temperature of about 22° to 100° C., pressing the admixture of meat and water at a temperature of about 22° to 60° C., whereby an oil-in-water emulsion is formed, and subsequently separating oil from the emulsion.

3. A process for the recovery of oil from the cocoanut which comprises comminuting cocoanut meat without a substantial rupturing of the cell structure, admixing with water, pressing the admixture of meat and water whereby an oil-in-water emulsion is formed, and subsequently separating oil from the emulsion by adjusting the pH value to from 3.0 to 5.6, and then removing the water and solids.

4. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by adding an acid reacting substance to give a pH value from 3.0 to 5.6, and then removing the water and solids.

5. A process for the recovery of oil from the cocoanut which comprises comminuting cocoanut meat without a substantial rupturing of the cell structure, admixing with water at a temperature of about 22° to 100° C., pressing the admixture of meat and water at a temperature of about 22° to 60° C., whereby an oil-in-water emulsion is formed and subsequently separating oil from the emulsion by adding acetic acid to obtain a pH value of from 3.5 to 5.1, and then removing the water and solids by centrifugal action.

6. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by inoculating said emulsion with an acid producing organism, propagating the organism therein until a pH value of 3.0 to 5.6 is obtained, and then removing the water and solids.

7. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by inoculating said emulsion with lactic acid organisms, propagating the organisms therein with production of lactic acid until a pH value of 3.0 to 5.6 is obtained, resolving into an oil layer and a water layer by centrifugal action, heating the oil layer to a temperature upwards to 280° C., and finally filtering.

8. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by adding an alcohol thereto, allowing the oil to coalesce, and removing the water and solids.

9. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by adding ethyl alcohol thereto in an amount upwards of 50% of the emulsion, allowing the oil to coalesce, and removing the water and solids.

10. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by subjecting the emulsion to relatively high power centrifugal action whereby a viscous oil emulsion, a residue and an aqueous extract are obtained, admixing the oil emulsion and residue, and subjecting to heat at a temperature upwards to 280° C.

11. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by adding an alcohol thereto, the emulsion having a pH value of from 2.5 to 7.0, allowing the oil to coalesce, and removing the water and solids.

12. In a process for the recovery of oil from the cocoanut, the improvement which consists in adjusting the pH value of an oil-in-water emulsion obtained from comminuted cocoanut meat of which the cell structure was substantially unruptured to from 3.0 to 5.6.

13. A process for the recovery of oil from nut meats and oleaginous seeds, which comprises comminuting said materials without substantial rupturing of the cell structure, admixing with water, pressing the admixture of comminuted material and water whereby an oil-in-water emulsion is formed and subsequently separating oil from the emulsion.

14. In a process for the recovery of oil from nut meats and oleaginous seeds, the improvement which consists in adjusting the pH value of an oil-in-water emulsion obtained from comminuted nut meats and seeds of which the cell structure was substantially unruptured, to from 3.0 to 5.6.

15. A process for the recovery of oil from the cocoanut which comprises comminuting cocoanut meat without a substantial rupturing of the cell structure, admixing with water, pressing the admixture of meat and water whereby an oil-in-water emulsion is formed and subsequently separating oil from the emulsion by subjecting the emulsion to relatively high power centrifugal action a plurality of times whereby a viscous oil emulsion, a residue and an aqueous extract are obtained, admixing the oil emulsion and residue, and subjecting to heat at a temperature upwards to 280° C.

VICENTE G. LAVA.